United States Patent [19]
Mills

[11] Patent Number: 6,017,040
[45] Date of Patent: Jan. 25, 2000

[54] SELF-LEVELLING PLATFORM FOR TROLLEY CONTAINER

[75] Inventor: Geoffrey Robin Mills, Nelson, New Zealand

[73] Assignee: Ergo-Lift Limited, Nelson, New Zealand

[21] Appl. No.: 08/983,603

[22] PCT Filed: Jun. 28, 1996

[86] PCT No.: PCT/NZ96/00065

§ 371 Date: Apr. 21, 1998

§ 102(e) Date: Apr. 21, 1998

[87] PCT Pub. No.: WO97/02170

PCT Pub. Date: Jan. 23, 1997

[30] Foreign Application Priority Data

Jun. 30, 1995 [NZ] New Zealand ............................ 272474

[51] Int. Cl.[7] ...................................................... B60S 9/00
[52] U.S. Cl. ............................ 280/6.15; 312/71; 108/136
[58] Field of Search ............................... 312/71; 108/136; 280/6.15

[56] References Cited

U.S. PATENT DOCUMENTS

| | | | |
|---|---|---|---|
| 2,798,640 | 7/1957 | Coddington | 220/93 |
| 2,919,168 | 12/1959 | Shivek | 312/71 |
| 3,080,066 | 3/1963 | Berridge | 211/49 |
| 3,659,913 | 5/1972 | Waldron et al. | 312/71 |
| 3,694,044 | 9/1972 | Cummings | 312/71 |
| 3,941,440 | 3/1976 | Menzin et al. | 312/71 |
| 4,300,611 | 11/1981 | Silverman | 312/71 |
| 4,764,075 | 8/1988 | Cox et al. | 414/99 |

*Primary Examiner*—Lanna Mai
*Assistant Examiner*—James S. McClellan
*Attorney, Agent, or Firm*—Kane, Dalsimer, Sullivan and Levy, LLP

[57] ABSTRACT

A self-levelling platform arrangement comprises a platform which may form the base of a trolley container, supported on a biasing mechanism that comprises a scissors jack arrangement incorporating a tension spring to provide the biasing force whereby the platform descends as items are loaded onto the platform and rises as items are unloaded. The load/tension ratio of the spring is adjustable. To achieve tensioning of the spring, one end of the spring is attached to one of the opposite arms of the scissors arrangement through a flange plate while the outer end is attached to one end of a balance beam member supported for rotation about a fulcrum, the position of the fulcrum being variable along the length of the beam. The other end of the beam member connects, via a further flange plate, to the other of opposite arms by a connecting rod.

11 Claims, 6 Drawing Sheets

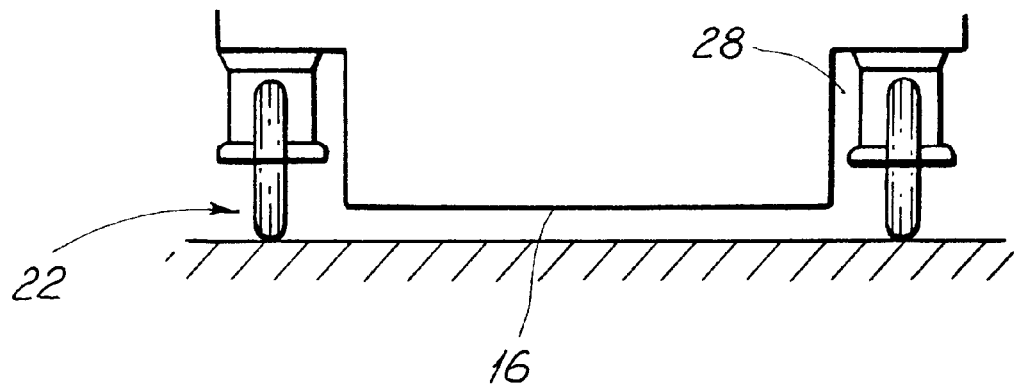
F I G. 4a
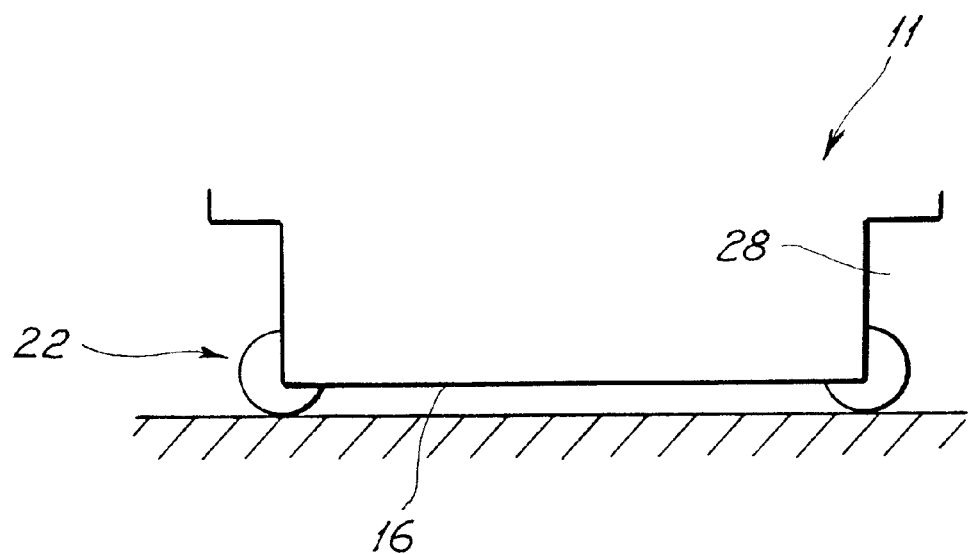
F I G. 4b

SELF-LEVELLING PLATFORM FOR TROLLEY CONTAINER

FIELD OF THE INVENTION

The present invention relates to a platform or trolley, particularly, though by no means exclusively, to a trolley for use in commercial laundry operations.

BACKGROUND OF THE INVENTION

Presently, in commercial laundry operations, loads of linen etc. are transported around a factory in wheeled bins or trolleys. Individual items are retrieved from a bin for further processing. This may entail a person bending into a trolley a number of times, usually between 50 and 400 times depending on the load involved. This amount of bending and lifting puts workers in this industry at risk from back strain and injury. In addition it has been noted that production rates drop significantly when operators are retrieving items from the lower half of trolleys where a greater degree of bending and lifting is required.

The present invention overcomes at least to some extent, the problems aforesaid.

SUMMARY OF THE INVENTION

According to the present invention there is provided a trolley having generally upright walls surrounding a base, said base comprising a platform supported on a biasing mechanism, the biasing mechanism being arranged to urge the platform upwardly towards a first working position whilst permitting downward movement of the platform when a load is placed on the platform, the amount of downward movement being dependent upon the load.

This arrangement uses the combination of changes in the degree of biasing to provide for incremental movements of the platform, in response to increasing loads placed thereon.

Using a trolley in accordance with the invention, the platform descends towards a lowermost position as items are loaded into the trolley and said platform rises again as items are unloaded, thereby maintaining items towards the top of the trolley enabling trolleys to be unloaded without an operator having to bend to retrieve items from the trolley. Whilst the sensitivity of the biasing mechanism may be adjusted manually, the arrangement of the invention provides for automatic upwards and downwards movement of the platform during use.

The biasing mechanism may comprise a scissors jack arrangement that incorporates a tension spring to provide a biasing force.

The scissors jack arrangement may comprise two arms pivotably connected at the central point. The first arm may be fixed to the underside of the platform at its upper end and be moveable within the base at its lower end. The second arm may be moveable along the underside of the platform at its upper end and fixed to the tension spring at its lower end.

In operation, when there is no load on the platform, the spring is lightly pre-tensioned and the second arm is pulled towards an upright position, thereby moving at its upper end towards the centre of the platform, raising the platform into an upright position. The first arm of the scissors jack arrangement moves in cooperation with the second arm.

When a load is placed on the platform, the tension spring resists any movement and urges the platform towards its uppermost position. As the load increases, the second arm moves away from the centre of the platform and the spring lengthens, lowering the platform. A particularly advantageous feature of the invention is that the incremental movement of the platform is directly related to the weight applied to the platform. Smooth movement of the platform is achieved irrespective of whereabouts on the platform an article is placed or removed; the scissors jack arrangement providing uniform support across the whole area of the platform.

The load/tension ratio of the spring may be adjusted to allow the platform to react to different densities of load.

To achieve tensioning of the spring, one end of the spring is preferably attached to one end of a beam member. The beam member is supported for rotation about a fulcrum, the position of the fulcrum determining the load applied to the spring and hence the sensitivity of the spring.

The position of the fulcrum is preferably variable along the length of the beam, to enable variation of the spring sensitivity. Specific fulcrum locations may be established to facilitate selection of sensitivity for particular loads. For example, the beam member may include recesses or apertures at selectable locations to receive a fulcrum member.

Alternatively, the fulcrum member may be moveable along the beam member and be locatable in position, for example, by clamping, in any selected location. Movement of the fulcrum may be achieved by a selecting lever locatable in selectable channels.

Movement of the fulcrum may be achieved by operation of worm screw, or like arrangement. In such an arrangement the worm screw may be operated manually of by way of a motor, pneumatic or hydraulic arrangement. Selection of the sensitivity acting may be electronically controlled.

The electronic means may comprise pre-set tensions to enable the trolley to be used for any number of items of varying density, e.g., tea towels, sheets, blankets each of which may be wet or dry.

The manual lever may be located towards the bottom of the trolley so that it is operated by an operator's foot.

The tension spring itself may be changed, each selectable spring allowing the trolley to be used for a different range of heavier or lighter densities.

At least upper portions of at least one of the side walls may taper outwardly towards the open top of the trolley. This arrangement facilitates loading and unloading operations and allows the trolley to be placed close to machines and conveyors for loading and unloading purposes. Another advantage of this arrangement is that the tapered portion of the side wall may act to minimise the chances of items falling in between a machine and the trolley.

The trolley may have recessed wheels located underneath the trolley in any wheel pattern, for example,
 i) swivel wheels in each corner;
 ii) fixed wheels at one end and swivel wheels at the other, and preferably;
 iii) fixed wheels at the axis and swivel wheels at each end.

The wheels may be positioned so that operators do not suffer "run over toes" and so that contact with physical obstructions in passages is avoided.

Any conventional type of wheel and wheel mounting may be suitable.

The trolley may be made of industrial PVC and/or metal. Preferably the trolley comprises a subframe that is shaped to support moulded wall panels and to support the base/platform arrangement. The panels may be constructed from a moulded material such as LURAN (a BASF product).

The trolley may comprises an integral moulding of PVC. The biasing mechanism may be made of steel and the platform of PVC.

Alternatively the trolley may comprise fibreglass of any other suitable material.

The trolley may have rounded corners and may be made to any convenient shape or size.

The trolley of the present invention may be suitable for use in any industry, for example, in warehousing and factory production lines.

In a further aspect, the invention provides a platform arrangement wherein the platform is supported on a biasing mechanism, the biasing mechanism being arranged to urge the platform upwardly towards a first working position whilst permitting downward movement of the platform when a load is placed on the platform, the amount of downward movement being dependent upon the load.

It will be appreciated that other features of the trolley as discussed above could be incorporated into such a platform arrangement.

The trolley will be further described with reference to the figures of the accompanying drawings in which:

BRIEF DESCRIPTION OF THE DRAWINGS

FIG. 2b shows a side view of the biasing mechanism of FIG. 2a;

FIG. 4a shows a side view of fixed wheels attached to a trolley according to the present invention, and FIG. 4b shows a side view of swivel wheels attached to a trolley according to the present invention.

DETAILED DESCRIPTION

Figure 1:
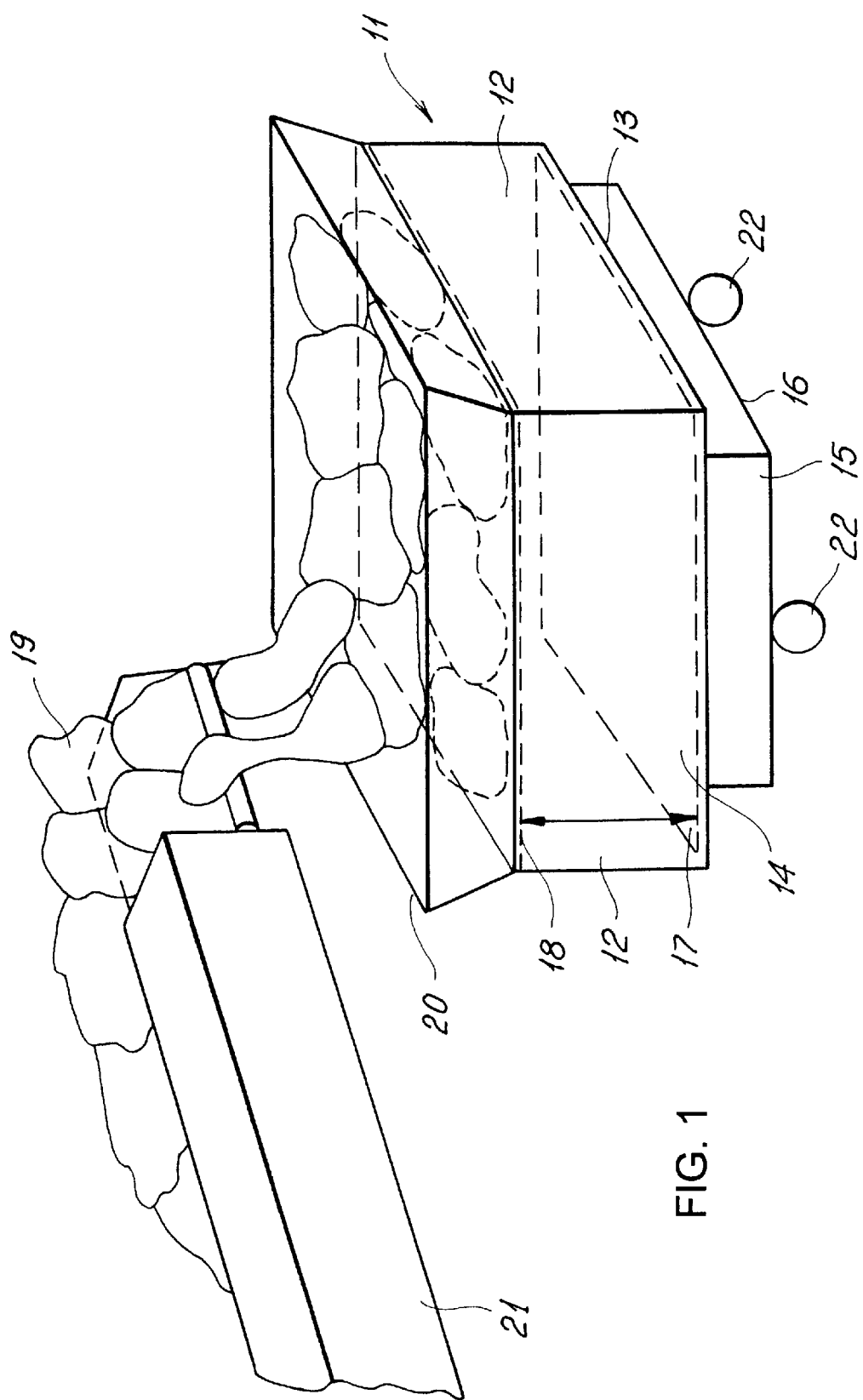
FIG. 1 shows a trolley according to the present invention in operation.

Referring now to FIG. 1 it can be seen that the trolley 11 comprises walls 12 and a base 13. The base 13 comprises a platform 14 which fits inside the walls 12. A biasing mechanism 15 is located underneath the platform 14 in housing 16. The biasing mechanism 15 (shown in more detail in FIGS. 2a–2d) urges the platform 14 upwards from a first position 17 at the bottom of the trolley 11 to a second position 18 at the top of the trolley 11. The biasing mechanism 15 is counteracted by a load 19. Thus when the trolley 11 is empty, the platform 14 is at the top of the trolley 11 in position 18. As the trolley is loaded the platform 14 descends towards the bottom of the trolley 11 and position 17 under the weight of the load 19. As the load 19 is removed from the trolley 11, the platform 14 rises thereby maintaining the load 19 at the top of the trolley enabling the trolley to be unloaded without an operator having to bend into the trolley to retrieve items therefrom.

The walls 12 of the trolley 11 are tapered 20 at the top to enable the trolley 11 to be placed close to the machine or conveyor 21 for loading and unloading purposes and also to help to avoid items falling in between the machine or conveyor 21 and trolley 11.

The trolley 11 has wheels 22 on the underside of housing 16 to enable the trolley 11 to be easily moveable around a workplace.

Figure 2A:
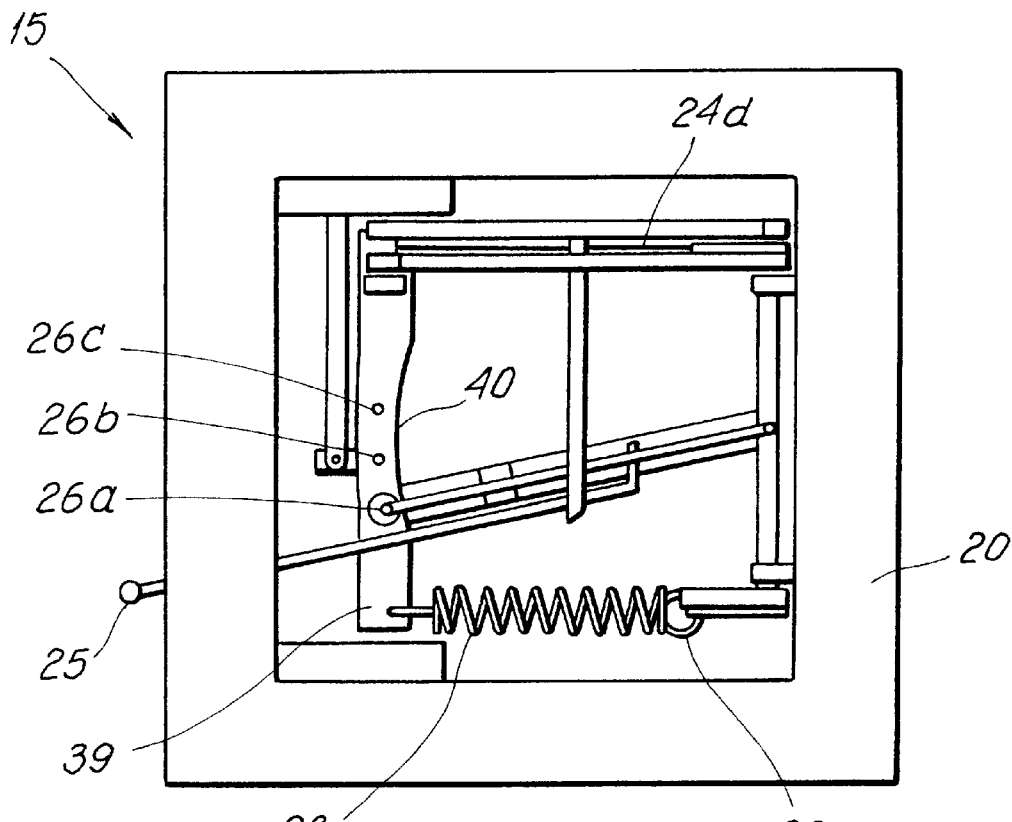
FIG. 2a shows a top view of the biasing mechanism of the present invention.
Figure 2B:
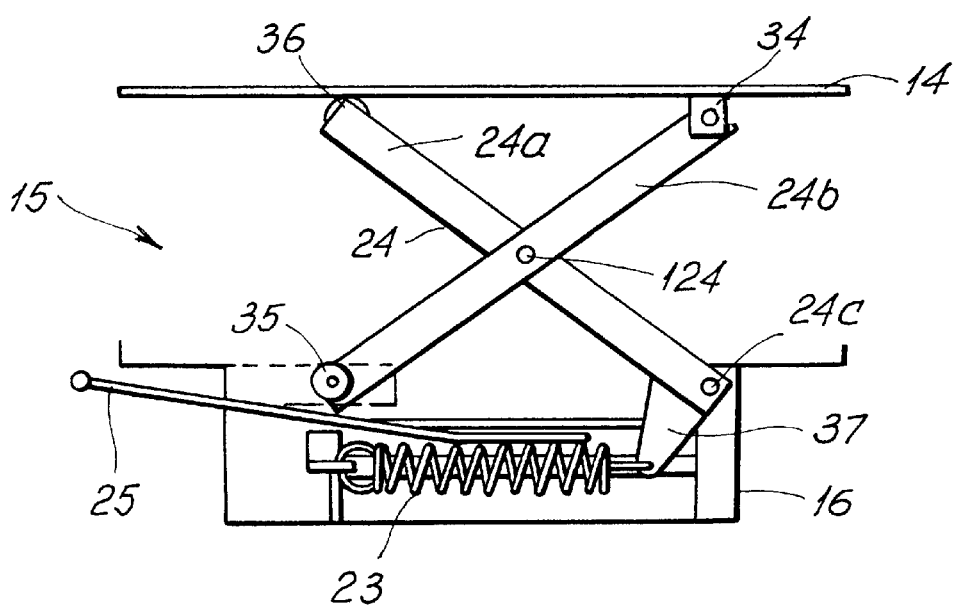

A first biasing mechanism 15 is shown in detail in FIGS. 2a and 2b. A spring 23 urges a scissors jack arrangement 24 into an extended position. The scissor jack arrangement 24 comprises a pair of scissor arm arrangements, one on either side of the trolley, each having two pivotally connected arms 24a, 24b held together at a centre 124. Each arm 24b is fixed to the underside of the platform 14 at its upper end 34 and is moveable within the housing 16 at its lower end 35. Each arm 24a is moveable along the underside of base 14 at its upper end 36 and is pivotally connected to the base of the trolley at a point 24c. The lower end of one of the arms 24a is connected to the tension spring 23 via a flange plate 37.

The lower end of the other arm 24a is also mounted pivotally to the base at a point corresponding to the point 24c and is connected, via a flange plate, to a connecting rod 24d. The length of the connecting rod arrangement 24d may be adjustable, for example, by a turn screw arrangement.

Thus, one end 23a of the spring 23 is connected to the flange plate 37 whilst the other end, 23b is connected to one end of a balance beam member 39. The other end of balance beam 39 is pivotally connected with the connecting rod arrangement 24d. The balance beam 39 is arranged to pivot about a selectable fulcrum point 26a, b or c. Although three such fulcrum points are shown in the drawings any suitable number of points may be provided. The balance beam 39 holds the spring in a pre-tensioned condition when the platform is unloaded.

In operation, when there is no load on the platform 14, spring 23 is lightly pre-tensioned and the spring urges the arms 24a and hence the arms 24b towards an upright position, the arms 24a, moving via a wheel or roller at the upper end 36 towards the centre of the platform 14, raising the platform 14 upwards towards the top of a trolley. As mentioned above, the biasing mechanism 15 is counteracted by a load bearing down on platform 14. When a load is placed on platform 14, the load acts through the spring 23 and connecting rod 24d on opposite ends of the balance beam 39. The selected position of the fulcrum determines the leverage, and hence load, applied to the spring. In a balanced position the tension spring 23 resists any movement to continue urging platform 14 towards the top of the trolley. As the load increases, arm 24a moves away from the centre of platform 14 and spring 23 lengthens, thereby lowering platform 14 in a controlled movement towards the lowermost position of the platform. The tension spring 23 may be adjusted to allow the platform 14 to react to different densities of load. A lever 25 may be shifted to three or any number of preset positions 26a, 26b and 26c on balance beam 39 which are set for a range of loads found in the laundry industry, for example light dry towels, garments and heavy damp sheets. Lever 25, acts by changing the fulcrum position at 26a, 26b, 26c, on the balance beam 39 making the spring more sensitive to different load densities.

Balance beam 39 comprises an arcuate portion 40 within which the fulcrum positions 26a, 26b and 26c are located. When lever 25 is in fulcrum position 26a nearest the spring 23, the load/tension ratio is high so that small changes in weight result in movement of the platform and such a setting is suitable for, for example, tea towels. As the fulcrum position is moved further away from the spring, heavier loads are required to effect the same movement of the platform 14 and thus fulcrum position 26b would be suitable for dry towels and fulcrum position 26c suitable for wet towels, for example.

The lever 25 may be located on the side of the trolley and positions easily changed by a simple foot movement. Any number of positions 26 may be incorporated into the biasing mechanism 15 depending on the number of different loads of different densities used by a particular industry.

Alternatively the lever may be operated electronically with any number of preset positions linked to switches so that settings may be changed for different load densities by a simple selection, for example, "tea towels", "blankets", "sheets", etc.

In addition to the different settings 26, the tension spring 23 itself may be replaced so that a range of springs 23 for different density loads may be used.

Figure 2C:
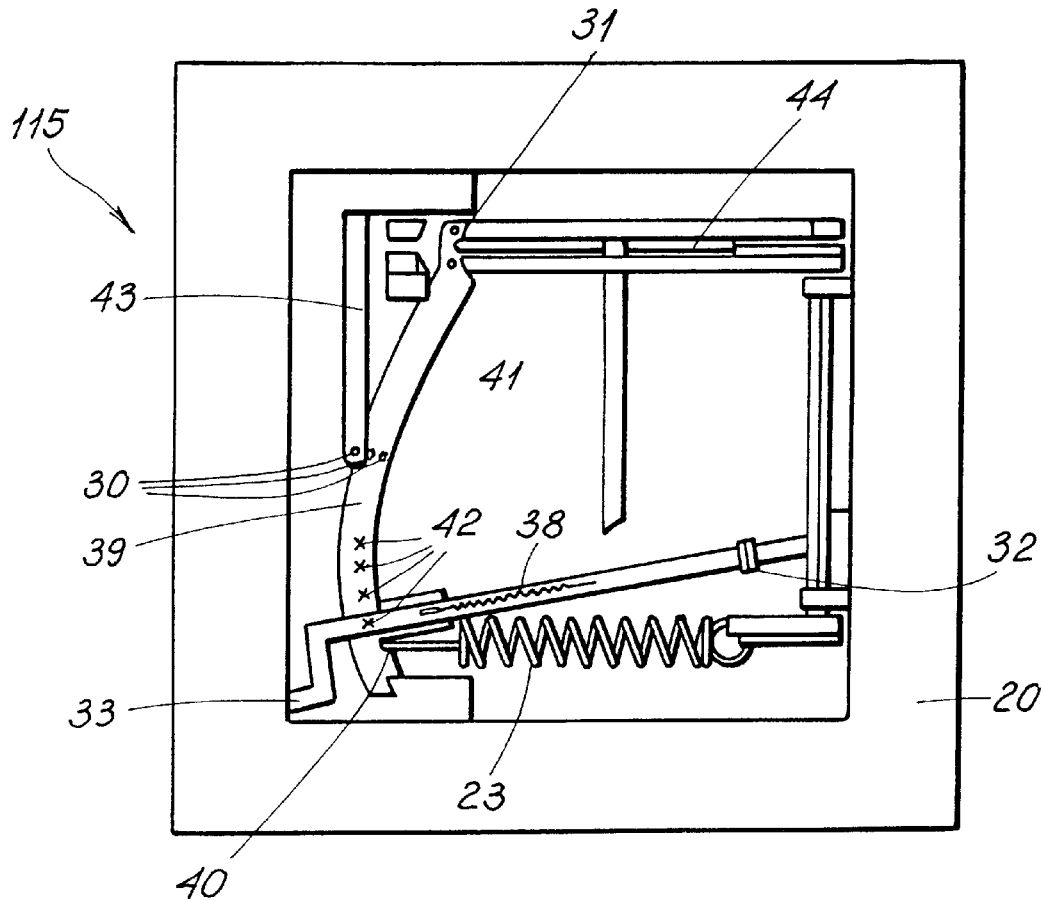
FIG. 2c shows a top view of a second biasing mechanism.
Figure 2D:
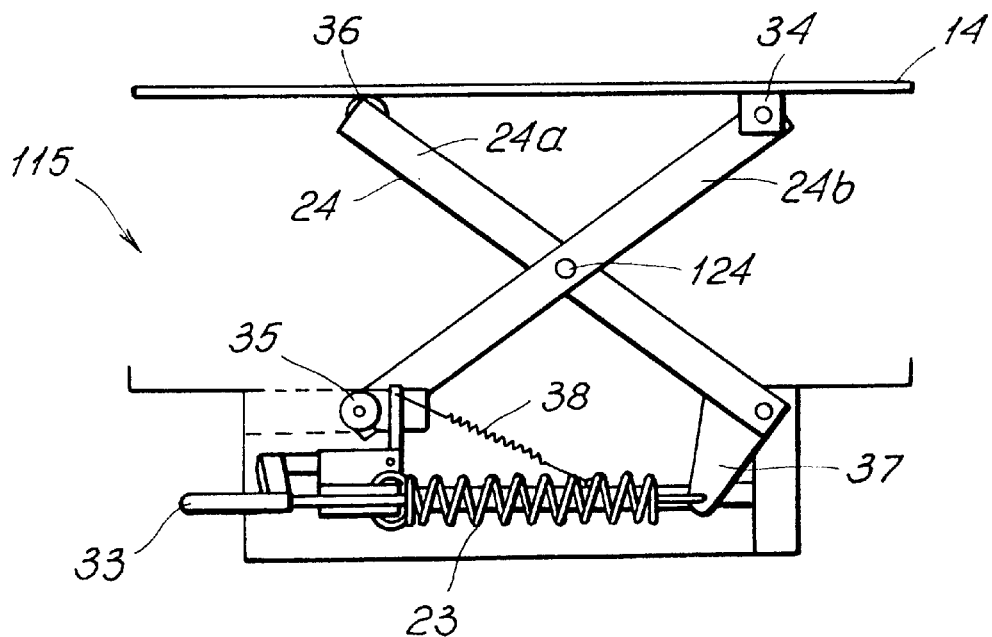
FIG. 2d shows a side view of the biasing mechanism of FIG. 2c.

An alternative, and presently preferred, biasing mechanism 115 is shown in FIGS. 2c and 2d. The biasing mechanism 115 works principally in the same manner as described above for the first biasing mechanism 15, but provides a modified arrangement for adjusting the selectable fulcrum positions and includes additional mechanisms for fine tuning the sensitivity of the biasing mechanism. Specifically adjustments may be made at three different positions 30, 31 and 32 thereby further modifying the load/tension ratios in conjunction with the selected position 26 on a balance beam 41 without the need to change spring 23.

A foot operated lever and arm 33, which carries a pivot arrangement, is moveable to bring the pivot into to different fulcrum positions 42 on arcuate balance beam 41. The pivot arrangement comprises a U-shaped element that extends from the lever arm 33 to partially surround the balance beam 41, one or more roller bearings is provided to support the pivot arrangement on the balance beam and provide the desired pivot action. The lever 33 may be located in a selected position, relative to the balance beam 41 at a selected fulcrum position 42 so that the pivot arrangement contacts the balance beam to provide the desired fulcrum. Alternatively the lever 33 may be replaced by a mechanised worm screw arrangement which may be electronically controlled. As described above, the closer the fulcrum position is set to the spring 23, the lighter the load that is required to move the platform 14.

In this second embodiment, lever 33 acts as the main adjustment mechanism of the load/tension ratio of spring 23. As shown in FIG. 3b, the lever may be moved along a channel 45 formed in the base between three, or any number, of notched positions, 45a, 45b, 45c. Location of the lever 33 in any of the notched positions, 45a, 45b, 45c acts to lock the lever in position relative to the balance beam 31, as discussed above.

Fine adjustment of the load/tension ratio and therefore the sensitivity of the spring is possible at positions 30, 31 and 32. At position 30, an anchor 43 to balance beam 41 can be shifted to one of three or more positions, which has the effect of changing the leverage applied by the balance beam 41, about the selected fulcrum position 42 and thus enables fine variation of the load/tension operating on the spring 23. Anchor 43 may be adjustable in length to allow fine adjustment to the main settings determined by the selected slot 45. At position 31 a linkage of the connecting rod 44 can be shifted between three or more positions 31 on balance beam 41 again altering the overall leverage of the balance beam 41 and its action on the spring 23. At position 32, lever arm 33 is adjustable in length thereby permitting small changes in the orientation of the balance beam and allowing fine setting of the degree of pretensioning of the spring 23.

In operation, for a particular load, the fine adjustments at positions 30, 31 and 32 would be pre-set with course adjustment of lever 33 being made for a final working ratio.

Examples of loads generally encountered in the laundry industry are as follows:

10–30 kg towels
20–50 kg sheets
30–100 kg heavier loads.

Figure 3A:
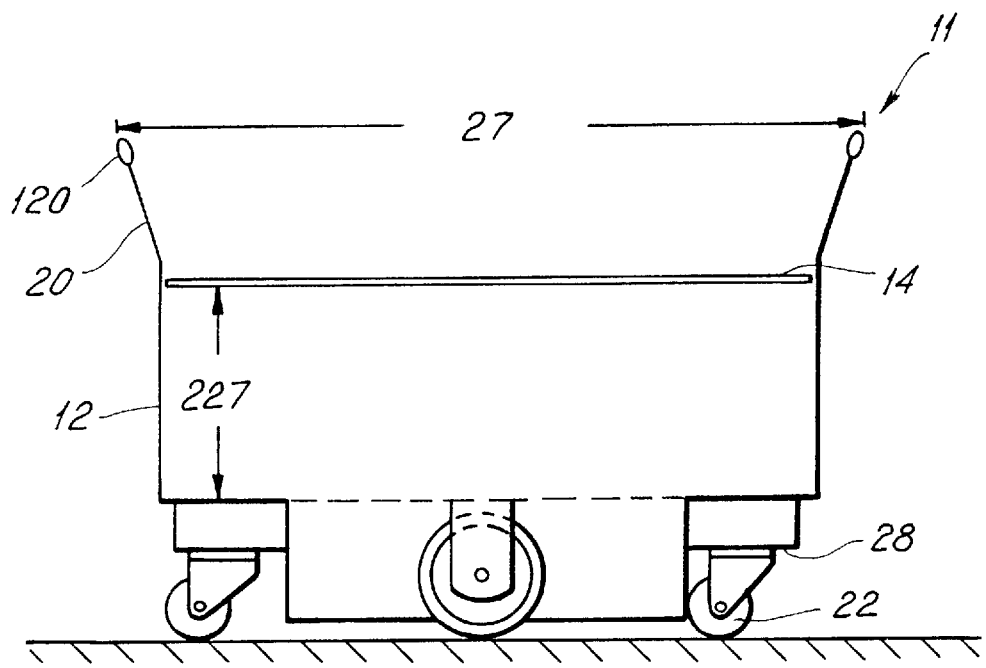
FIG. 3a shows a side view of the trolley of FIG. 1.
Figure 3B:
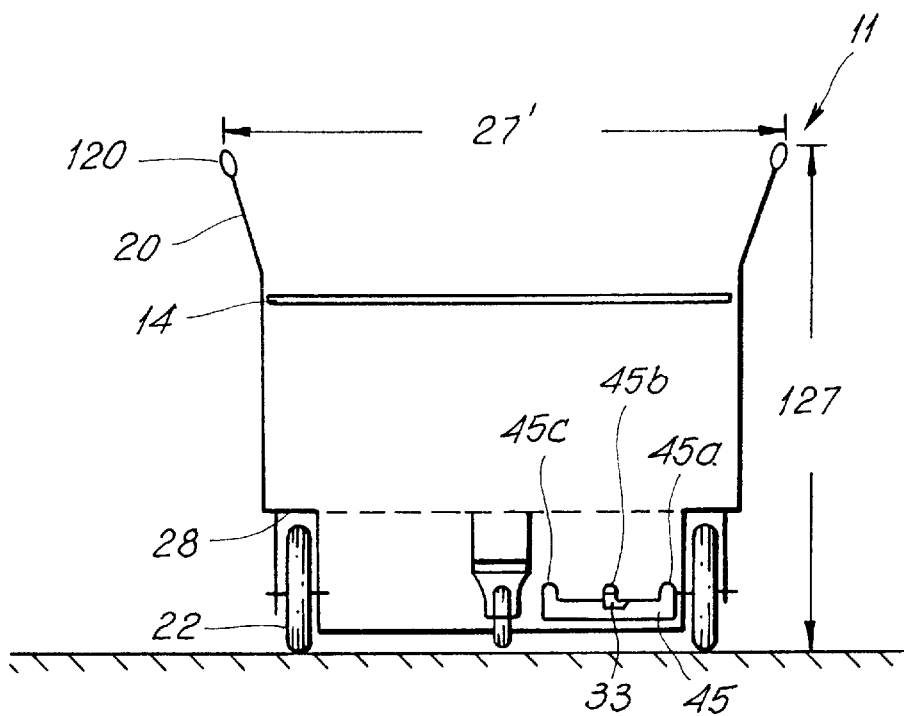
FIG. 3b shows an end view of the trolley of FIG. 1.
Figure 3C:
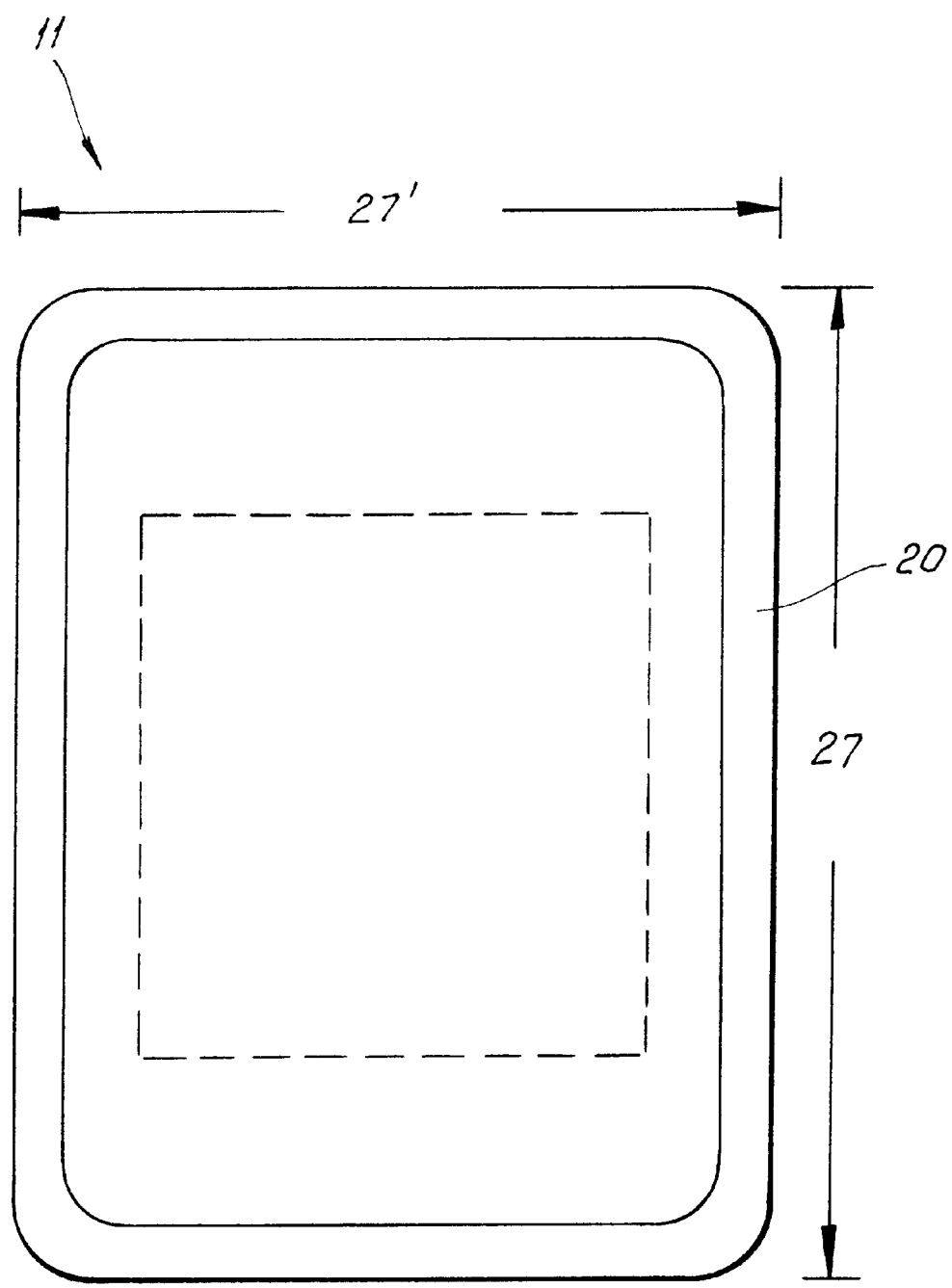
FIG. 3c shows a top view of the trolley of FIG. 1.

FIGS. 3a, 3b and 3c show a preferred shape of trolley 11 having an overall oblong shape with walls 12 of height 0.350 metres (227) and funnel shaped top 20 of height 0.250 metres giving an overall height of trolley 11 of 0.830 meters (127). The width of the trolley 11 is preferably 0.900 metres (27') by 1.200 meters (27).

The trolley 11 has wheels 22 located underneath the housing 16. The wheels are fitted in recess 28 in order to avoid the wheels running over operators toes and to avoid the wheels contracting physical obstructions in passages. The wheels 22 may be either fixed wheels, as shown in FIG. 4a or swivel wheels as shown in FIG. 4b and may be arranged in any suitable wheel pattern, for example;

i) swivel wheels in each corner;

ii) fixed wheels at one end and swivel wheels at the other, and preferably iii) fixed wheels at the axis and swivel wheels at each end.

Any conventional type of wheel and wheel mounting may be suitable for the trolley of the present invention.

The bin part of the trolley is preferably made as an integral moulding of a suitable PVC or other material, having rounded corners as shown in FIG. 3c. The platform 14 is also preferably made from PVC and the biasing mechanism 15, 115 is preferably made from steel. However, the trolley 11 may be made from any suitable material, for example, metal, fibreglass, wood etc.

It is envisaged that the trolley 11 of the present invention will be useful in many industries, for example, warehousing and factory line productions. Although described as a bin style trolley, the platform may be provided in a table form. In such an arrangement a skirt that is suspended below the table top platform may be provided to screen the binning mechanism.

It will be appreciated that it is not intended to limit the invention to the above examples only, any variations, which may readily occur to a person skilled in the art, being possible without departing from the scope of the invention.

We claim:

1. A platform arrangement wherein the platform is supported on a support mechanism, including a scissors jack arrangement comprising two spaced apart pairs of pivotally connected first and second lever arms, a balance beam extending between said spaced apart pairs of lever arms, and a biasing element, the first arm of one of said pairs of lever arms being connected directly to one end of said balance beam and the second arm of the other of said pairs of lever arms being connected to the other end of the balance beam via said biasing element so that a leverage effect is applied at both ends of the balance beam, the support mechanism being arranged to urge the platform upwardly towards a first working position whilst permitting downward movement of the platform when a load is placed on the platform, the amount of downward movement being dependent upon the load, wherein changes in the degree of biasing provide for incremental movements of the platform, in response to increasing loads placed thereon, wherein the load/tension ratio of the biasing element may be adjusted to allow the platform to react differently to different densities of load, and wherein the balance beam member is supported for rotation about a fulcrum, the position of the fulcrum determining the load applied to the biasing element and hence the sensitivity of the biasing element, and enabling an adjustable pre-load to be applied to the biasing element.

2. A trolley having generally upright walls surrounding a base, said base comprising a platform supported on a support mechanism, including a scissors jack arrangement comprising two spaced apart pairs of pivotally connected first and second lever arms, a balance beam extending between said spaced apart pairs of lever arms, and a biasing element, the first arm of one of said pairs of lever arms being connected directly to one end of said balance beam and the second arm of the other of said pairs of lever arms being connected to the other end of the balance beam via said biasing element so that a leverage effect is applied at both ends of the balance beam, the support mechanism being arranged to urge the platform upwardly towards a first working position whilst permitting downward movement of the platform when a load is placed on the platform, the amount of downward movement being dependent upon the load, wherein changes in the degree of biasing provide for incremental movements of the platform, in response to increasing loads placed thereon, wherein the load/tension ratio of the biasing element may be adjusted to allow the platform to react differently to different densities of load, and wherein the balance beam member is supported for rotation about a fulcrum, the position of the fulcrum determining the load applied to the biasing element and hence the sensitivity of the biasing element, and enabling an adjustable pre-load to be applied to the biasing element.

3. A platform according to claim 1, wherein the biasing element is a spring.

4. A platform arrangement according to claim 3, wherein the scissors jack arrangement comprises two pairs of arms each pair being pivotally connected at a central point, a first arm of each pair being fixed to an underside of the platform at its upper end and being moveable within the base at its lower end and a second arm moveable along the underside of the platform at its upper end and fixed to the tension spring at its lower end.

5. A platform arrangement according to any one of claims 1, wherein the position of the fulcrum is variable along the length of the beam, to enable variation of the spring sensitivity.

6. A platform arrangement according to any one of claims 3 to 6, wherein the fulcrum member is moveable along the beam member and is locatable in position, for example, by clamping, in any selected location.

7. A platform arrangement according to claim 6, wherein movement of the fulcrum is achieved by a selecting lever locatable in selectable channels.

8. A platform arrangement according to claim 6, wherein movement of the fulcrum is achieved by operation of a work screw, the work screw being operable manually by way of a motor, pneumatic or hydraulic arrangement.

9. A platform arrangements according to claim 8, wherein the lever is located towards the bottom of a trolley so that it is operable by an operator's foot.

10. A platform arrangement according to claim 3, wherein a tension spring itself may be changed, each selectable spring allowing the trolley to be used with a different range of heavier or lighter density articles.

11. A platform arrangement according to claim 3, wherein at least an upper portion of at least one of the side walls may taper outwardly towards the open top of the trolley.

* * * * *